US012395352B2

United States Patent
Yin et al.

(10) Patent No.: US 12,395,352 B2
(45) Date of Patent: Aug. 19, 2025

(54) QUANTUM DIGITAL SIGNATURE METHOD AND QUANTUM DIGITAL SIGNCRYPTION METHOD

(71) Applicants: NANJING UNIVERSITY, Jiangsu (CN); MATRICTIME DIGITAL TECHNOLOGY CO., LTD, Nanjing (CN)

(72) Inventors: Hua-Lei Yin, Nanjing (CN); Chen-Xun Weng, Nanjing (CN); Yao Fu, Nanjing (CN); Zeng-Bing Chen, Nanjing (CN)

(73) Assignees: NANJING UNIVERSITY, Nanjing (CN); MATRICTIME DIGITAL TECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 18/247,151

(22) PCT Filed: Sep. 14, 2022

(86) PCT No.: PCT/CN2022/118785
§ 371 (c)(1),
(2) Date: Mar. 29, 2023

(87) PCT Pub. No.: WO2023/082823
PCT Pub. Date: May 19, 2023

(65) Prior Publication Data
US 2024/0364533 A1   Oct. 31, 2024

(30) Foreign Application Priority Data
Nov. 12, 2021 (CN) .......................... 202111336020.2

(51) Int. Cl.
*H04L 9/32* (2006.01)
*G06F 21/45* (2013.01)
(Continued)

(52) U.S. Cl.
CPC .......... *H04L 9/3247* (2013.01); *H04L 9/0852* (2013.01); *H04L 9/0869* (2013.01)

(58) Field of Classification Search
CPC ... H04L 9/3247; H04L 9/0852; H04L 9/0869; G06F 21/64; G06F 21/45; G06F 21/602; G06N 10/00
See application file for complete search history.

(56) References Cited

U.S. PATENT DOCUMENTS

2007/0110232 A1   5/2007  Akiyama et al.
2016/0248586 A1*  8/2016  Hughes .................. H04L 63/08
(Continued)

FOREIGN PATENT DOCUMENTS

CN   106688204 A   5/2017
CN   110324357 A   10/2019
(Continued)

OTHER PUBLICATIONS

International Search Report and Written Opinion from International Application No. PCT/CN2022/118785 mailed Nov. 29, 2022.
(Continued)

*Primary Examiner* — Vu V Tran
(74) *Attorney, Agent, or Firm* — Dorsey & Whitney LLP

(57) ABSTRACT

Method for confirming ownership of digital assets based on hash algorithm and method for tracing to a source of digital assets based on hash algorithm are provided. Entities involved in confirming the ownership of digital assets include an original user, a CA authentication center and a digital asset authentication center. The process of confirming the ownership includes generating a one-time CA certificate by the original user, authenticating the digital assets by the digital asset authorization center and the original user, generating an ownership confirming document by the original user, creating a quantum digital signature by a three-
(Continued)

party, and the like. The method for tracing includes generating subsidiary documents in real time, constructing a unique identity for a digital asset at an accessing moment, traceability analysis, and so on.

20 Claims, 2 Drawing Sheets

(51) Int. Cl.
    *G06F 21/60*     (2013.01)
    *G06F 21/64*     (2013.01)
    *G06N 10/00*     (2022.01)
    *H04L 9/08*     (2006.01)

(56) References Cited

U.S. PATENT DOCUMENTS

| | | | |
|---|---|---|---|
| 2017/0250819 | A1 | 8/2017 | Hoffstein et al. |
| 2019/0327095 | A1* | 10/2019 | Hong .................... H04L 9/0852 |
| 2019/0379536 | A1* | 12/2019 | Han ...................... H04L 9/3268 |

FOREIGN PATENT DOCUMENTS

| | | | |
|---|---|---|---|
| CN | 112039837 | A | 12/2020 |
| CN | 113779645 | A | 12/2021 |
| IN | 113297633 | A | 8/2021 |
| JP | 2004228916 | A | 8/2004 |

OTHER PUBLICATIONS

Office Action for Chinese Application No. 202111336020.2 mailed Dec. 28, 2021.

* cited by examiner

QUANTUM DIGITAL SIGNATURE METHOD AND QUANTUM DIGITAL SIGNCRYPTION METHOD

CROSS REFERENCE TO RELATED APPLICATIONS

This application is a U.S. National Stage Application, filed under 35 U.S.C. 371, of International Patent Application No. PCT/CN2022/118785, filed on Sep. 14, 2022, which claims priority to Chinese Patent Application No. 202111336020.2, filed on Nov. 12, 2021, entitled as "QUANTUM DIGITAL SIGNATURE METHOD AND QUANTUM DIGITAL SIGNCRYPTION METHOD", the entire contents of which are incorporated herein in their entireties.

TECHNICAL FIELD

The present disclosure relates to the technical field of quantum security, and more particularly, relates to a quantum digital signature method and a quantum digital signcryption method.

BACKGROUND

Encryption and digital signatures are two basic cryptographic tools that ensure confidentiality, integrity, authenticity, and non-repudiation. In an asymmetric secret key system, the traditional way is to perform digital signing on a message and then encrypt the output (sign-then-encryption), which may lead to two problems: such stacking of solutions is inefficient and costly, and there may be a situation where any one of the solutions may not guarantee security. Signcryption is a technique that combines digital signing and encryption in one logical step. Comparing with the conventional sign-then-encryption method, signcryption may effectively reduce computational power consumption and communication loss while providing both digital signing and encryption solutions in a more efficient way.

However, most of the current general digital signature and digital signcryption solutions are based on asymmetric secret key systems, whose security is based on unproven mathematical problems. With the rapid enhancement of classical computing power and the explosive development of quantum algorithms, it will be possible for attackers to crack various signcryption algorithms by brute force in the near future, and the current classical digital signature and signcryption solutions will be no longer secure. Especially, Peter Shor proposed the quantum Shor algorithm in the year of 1994, which makes it feasible to quickly crack public key algorithms based on prime factorization and discrete logarithm problems. In another word, the appearance and development of quantum computers in the future will form a fatal threat to the current classical digital signature and digital signcryption solutions. In the fast-developing digital society at present, security of those solutions may not meet the requirements of verifying the authenticity of the message and ensuring the security of the message at the same time.

It is recited in a Chinese patent application "QUANTUM DIGITAL SIGNATURE METHOD" with application number 202110841257.X that, during digital signing, a signing party, a first verifying party and a second verifying party each determine, before generation and verification of the signature, an irreducible polynomial used for generating a hash function, where the irreducible polynomial is fixed and has been shared in advance. This quantum digital signature solution is based on unconditional security in information theory, but the irreducible polynomial in this solution is fixed, therefore, the solution is at risk of being attacked due to leakage of the irreducible polynomial.

In summary, existing classical digital signature and digital signcryption solutions may not offer enough security support for the current fast-developing digital society. Therefore, many quantum digital signature solutions are emerging. A most efficient quantum digital signature solution at present is proposed by a patent application No. 202110841257.X, which is at risk of leaking the irreducible polynomial. Meanwhile, there is no unconditionally secure digital signcryption solution existing today. Therefore, it is especially important and urgent to invent an unconditionally secure quantum digital signature and signcryption solution.

SUMMARY

Objective of the disclosure: objective of the present disclosure is to provide a quantum digital signature method and a quantum digital signcryption method that resolve a problem that the security of classical digital signcryption protocol at current stage is immensely threatened, a problem that breaches of numerous early hash functions and public secret key algorithms, as well as an occurrence of future quantum computers may pose fatal threats to the security of current digital signcryption protocol. At the same time, a problem of security risk caused by leakage of a fixed irreducible polynomial in a highly effective digital signature solution is resolved; and problems of low efficiency of current digital singing or signcryption protocol, high resource consumption, and high communication resource consumption for signature generation are also resolved.

Technical solution: a quantum digital signature method is provided by the present disclosure. The method includes the following steps:

(1) a step of preparing secret keys, wherein a signing party, a receiving party and a verifying party respectively holding two strings of random secret keys, and secret sharing being formed among the secret keys of the signing party, the receiving party and the verifying party;

(2) a step of generating a signature: obtaining, by a random number generator of the signing party, an n-bit true random number, which is used to generate an irreducible polynomial; generating, by the signing party, a hash function based on a linear feedback shift register by using, a first string of secret key of the signing party, serving as an input random number, together with the irreducible polynomial; obtaining, by the signing party, a hash value by inputting a message to be signed into the hash function; then a message digest is formed by the hash value and a character string comprised of coefficients of terms of respective orders except the highest order of the irreducible polynomial; generating, by the signing party, a signature by performing an unconditionally secure encryption on the message digest using a second string of secret key of the signing party;

(3) a step of verifying the signature: sending, by the signing party, the message to be signed and the signature as a whole to the receiving party; the receiving party, upon reception, sending its two strings of secret keys, the message to be signed and the signature to the verifying party; the verifying party, upon reception, sending its two strings of secret keys to the receiving party; deducing, by the receiving party and the verifying party respectively, the two strings of secret keys of the signing party according to secret keys held by the receiving party and the verifying party;

performing decryption operation on the signature by the receiving party and the verifying party respectively using second strings of secret keys of the signing party deduced by the receiving party and the verifying party to obtain a first backward digest and a second backward digest; generating an irreducible polynomial by successively corresponding respective bits in a character string of each of the first backward digest and the second backward digest to coefficients of terms of respective orders other than the highest order of the irreducible polynomial, where a coefficient of the highest order is 1; generating hash functions using the generated irreducible polynomial and first strings of secret keys of the signing party respectively deduced by the receiving party and the verifying party, and inputting the received message to be signed into the generated hash functions to generate a first forward hash value of the receiving party and a second forward hash value of the verifying party; wherein in a case that the first forward hash value is equal to a hash value in the first backward digest, the receiving party accepts the signature, otherwise the receiving party does not accept the signature, in a case that the second forward hash value is equal to a hash value in the second backward digest, the verifying party accepts the signature, otherwise the verifying party does not accept the signature, and digital signing is completed when both the receiving party and the verifying party accept the signature at the same time.

Further, in the step (1), the secret keys of participating parties satisfy following secret sharing conditions:

$$X_1 \oplus X_2 \oplus X_3=0, Y_1 \oplus Y_2 \oplus Y_3=0,$$

in the formulas, $X_1$ and $Y_1$ are respectively a first string of secret key and a second string of secret key held by the signing party, $X_2$ and $Y_2$ are respectively a first string of secret key and a second string of secret key held by the receiving party, $X_3$ and $Y_3$ are respectively a first string of secret key and a second string of secret key held by the verifying party.

Further, in the step (2), the unconditionally secure encryption is a one-time pad XOR encryption.

Further, in the step (2), the hash function based on the linear feedback shift register is a Toeplitz matrix with n×m dimensions, wherein n is a length of the first string of secret key of the signing party, m is a length of the message to be signed.

Further, in the step (2), a specific procedure for generating the irreducible polynomial using the n-bit random number includes:

1) firstly, generating a polynomial of order n in a GF(2) domain by successively corresponding respective bits in the n-bit true random number to coefficients of terms of respective orders other than the highest order of the polynomial, wherein a coefficient of the highest order is 1;

2) secondly, verifying whether the polynomial is an irreducible polynomial; in the case that a verification result is no, generating another set of true random number from the random number generator of the signing party, and with the newly generated true random number, returning to re-generate a polynomial and to verify whether the polynomial is an irreducible polynomial; in the case that the verification result is yes, stopping the verification and obtaining the irreducible polynomial.

Further, a way to verify whether the polynomial is an irreducible polynomial includes:

verifying in turn whether $\gcd(p_1(x),x^{2^i}-x)=1$ is true, wherein i=1, 2, ..., [n/2], and [n/2] means rounding of n/2; in a case that verifications of all values of i are successful, determining that $p_1(x)$ is an irreducible polynomial of order n on GF(2) domain; here, $\gcd(f(x),g(x))$ represents the greatest common factor of $f(x)$ and $g(x)$ on GF(2) domain, and $f(x)$ and $g(x)$ are two arbitrary polynomials.

Further, a way to verify whether the polynomial is an irreducible polynomial includes:

verifying whether condition $x^{2^n}=x \mod p_1(x)$ and condition $\gcd(p_1(x),x^{2^{n/d}}-x)=1$ are both true at the same time, where $x^{2^n}=x \mod p_1(x)$ indicates a remainder of $x^{2^n} \mod p_1(x)$ and a remainder of $x \mod p_1(x)$ are identical, d is an arbitrary prime factor of n, $\gcd(f(x), g(x))$ represents the greatest common factor of $f(x)$ and $g(x)$ on GF(2) domain, where $f(x)$ and $g(x)$ are two arbitrary polynomials; in a case that the two verification conditions are both satisfied at the same time, determining that $p_1(x)$ is an irreducible polynomial of order n on GF(2) domain.

Further, prior to the step (1), in a case that the last bit of the n-bit true random number is 0, the last bit of the n-bit true random number is set to be 1; or, in a case that the last bit of the true random number is 0, an n-bit true random number is re-generated until the last bit of the generated n-bit true random number is 1.

A quantum digital signcryption method is also provided by the present disclosure. The method includes the following steps:

step a. encrypting: encrypting, by a signcrypting party, a plaintext using a confidential secret key to obtain a cyphertext.

step b. performing a digital signing on the cyphertext using the quantum digital signature method mentioned above, wherein during the digital signing process on the cyphertext, the cyphertext is taken as a message to be signed and the confidential secret key is sent by the signcrypting party to the receiving party in an unconditionally secure manner.

step c. after completing the digital signing process, the receiving party decrypting the cyphertext based on the confidential secret key to obtain a plaintext, wherein the plaintext is a message needs to be obtained eventually.

Further, in the step b, the unconditionally secure manner is achieved via a quantum secret key distribution technology or quantum random number secure delivering.

A quantum digital signcryption method is also provided by the present disclosure. The method includes the following steps:

S1, encryption: encrypting, by a signcrypting party, a plaintext using a confidential secret key to obtain a cyphertext; sending the cyphertext to a receiving party from the signcrypting party, and upon reception, sending the cyphertext to a verifying party from the receiving party; meanwhile, sending the confidential secret key to the receiving party and the verifying party in an unconditionally secure manner from the signcrypting party.

S2, performing digital signing on the plaintext message using the quantum digital signing method mentioned above, wherein the plaintext message is taken as a message to be signed during the process of digital signing on the plaintext message; decrypting, by the receiving party and the verifying party, the cyphertext based on the confidential secret key to obtain the message to be signed, namely the plaintext message, and the message to be signed does not need to be sent by the signcrypting party to the receiving party nor to the verifying party.

S3, upon completing the digital signing, obtaining the plaintext message which is the message eventually needed to be obtained.

Further, in the step S2, the unconditionally secure manner is achieved via a quantum secret key distribution technology or true quantum random number secure delivering.

Beneficial effects of the present disclosure are as follows:
(1) the method provided by the present disclosure may achieve real unconditionally secure signcryption, which is ensured by rigorous mathematical justification of an unconditionally secure one-time pad technology and a one-time global domain hash technology; it is truly unconditionally secure, and is secure in the presence of increasingly powerful classical computational attack or future revolutionary quantum computational attack;
(2) security of a hash function used during the implementation of signcryption or signing is ensured by an irreducible polynomial and a hash function secret key used as an input random number. As the irreducible polynomial depends on a local true random number, it is not known in advance by the receiving party nor the verifying party before a signcrypting or signing process, which is equivalent to using an unconditionally secure hash function. Therefore, security of the signcrypting or signing process is ensured, and a security risk due to leakage of a fixed irreducible polynomial in other forms of signing may be directly avoided.
(3) a hash function which is updated every time based on a linear feedback shift register is used by the present disclosure to generate a hash value, and the hash value is unconditionally encrypted with a one-time pad. Therefore, signing and signcrypting may be performed on messages of any lengths, and it is more efficient and unconditionally secure compared to existing signcrypting or signing protocols.

DETAILED DESCRIPTION OF THE EMBODIMENTS

Figure 1:
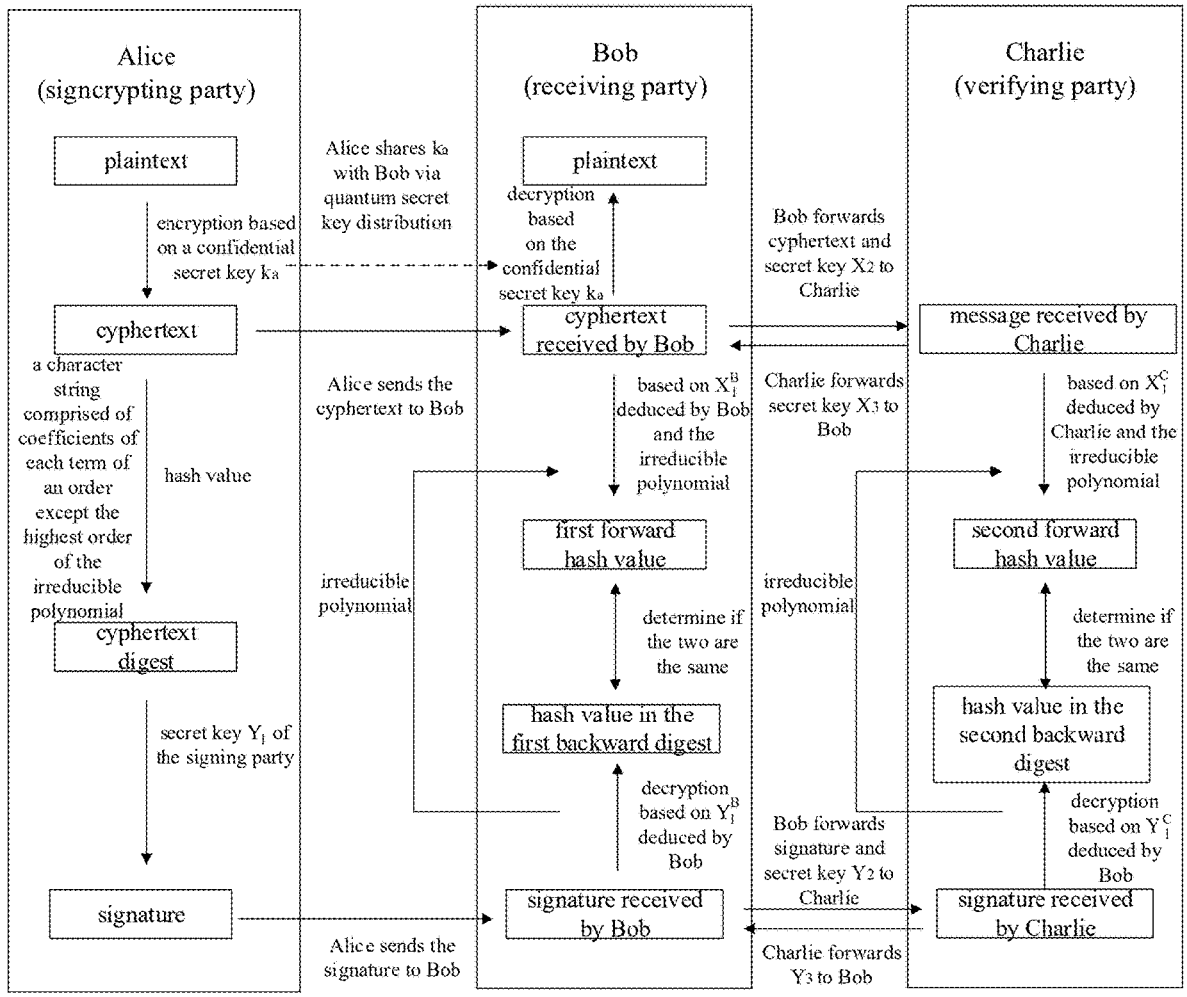
FIG. 1 is a flow chart of quantum digital signcryption according to a second embodiment.
Figure 2:
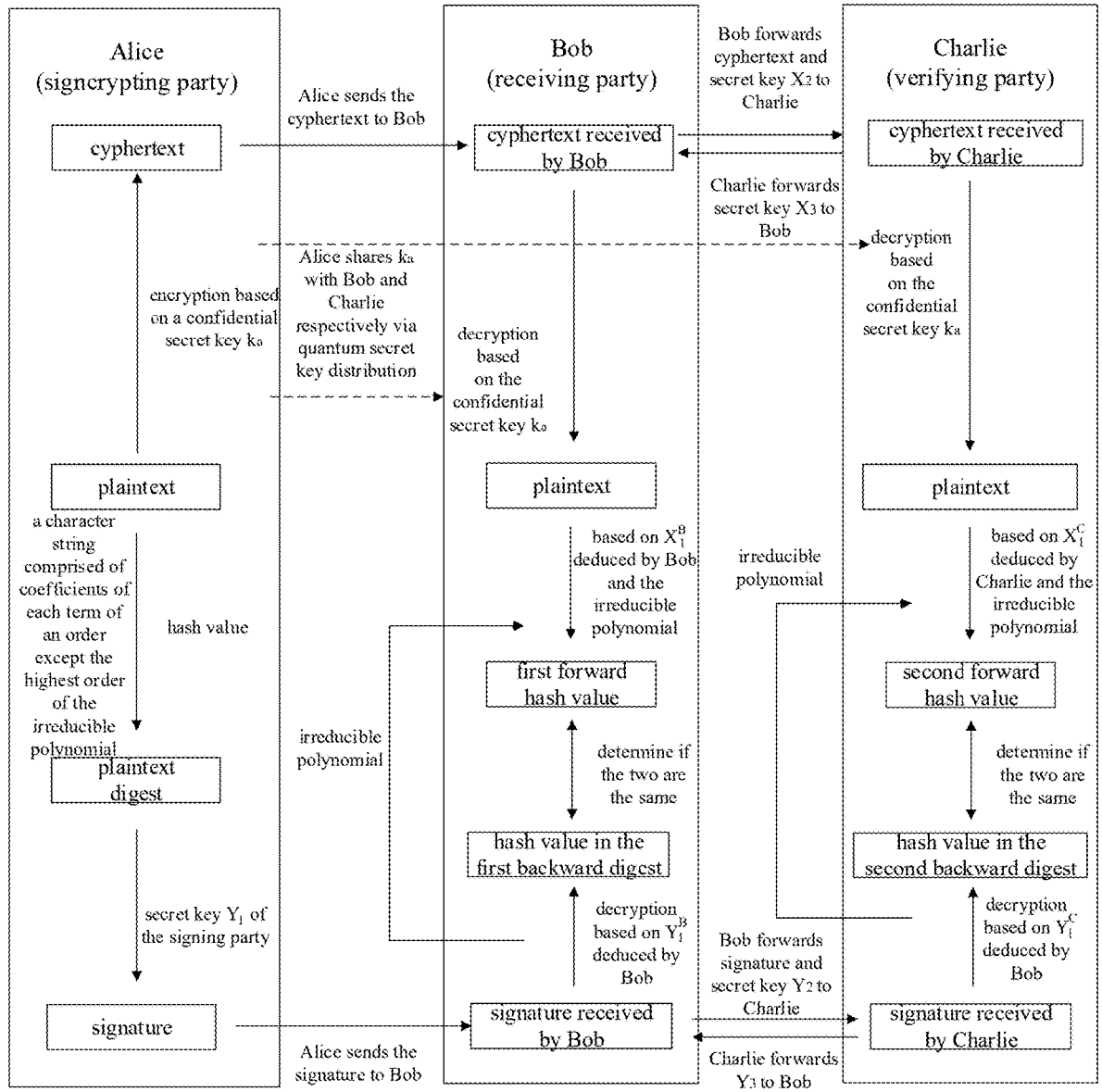
FIG. 2 is a flow chart of quantum digital signcryption according to a third embodiment.

The disclosure is further described in detail in conjunction with the drawings and embodiments.

First Embodiment

A quantum digital signature method of the present disclosure includes the following three steps: preparing secret keys, generating a signature and verifying the signature.
(1) Preparing Secret Keys.
A signing party, a receiving party and a verifying party respectively hold two strings of random secret keys. The six strings of secret keys are grouped into two groups, denoted as group X and group Y. The two strings of random secret keys held by the signing party are denoted as $X_1$ and $Y_1$. In a similar manner, the receiving party holds $X_2$ and $Y_2$ and the verifying party holds $X_3$ and $Y_3$. Secret sharing is formed among the secret keys of the signing party, the receiving party and the verifying party. The secret sharing is preferably implemented by quantum secret sharing.

Secret sharing relationship: $X_1$ may be deduced only when $X_2$ and $X_3$ are held simultaneously, and $Y_1$ may be deduced only when $Y_2$ and $Y_3$ are held simultaneously, namely satisfying the following conditions:

$$X_1 \oplus X_2 \oplus X_3 = 0, \ Y_1 \oplus Y_2 \oplus Y_3 = 0,$$

in the formulas, $X_1$ and $Y_1$ are respectively a first string of secret key and a second string of secret key held by the signing party, $X_2$ and $Y_2$ are respectively a first string of secret key and a second string of secret key held by the receiving party, $X_3$ and $Y_3$ are respectively a first string of secret key and a second string of secret key held by the verifying party, where $X_1$, $X_2$, $X_3$ are n-bit and $Y_1$, $Y_2$, $Y_3$ are 2n-bit.

(2) Generating a Signature.
The signing party obtains, via its own random number generator, an n-bit true random number used to generate an irreducible polynomial. A specific procedure is as follows.

Firstly, a polynomial of order n in the GF(2) domain is generated by successively corresponding respective bits in the n-bit true random number to coefficients of terms of respective orders other than a highest order of the polynomial, wherein a coefficient of the highest order is 1. For example, a true random number of n-bit is $(a_{n-1}, a_{n-2}, \ldots, a_1, a_0)$, and a polynomial $p_1(x) = x^n + a_{n-1}x^{n-1} + \ldots + a_1 x + a_0$ is generated. Preferably, only when $a_0 = 1$ may a generated polynomial be an irreducible polynomial. Therefore, to reduce the computational workload of verifying the irreducible polynomial at a later stage, determination of the true random number may be first conducted: in the case that the last bit of the true random number is 0, then let the last bit of the true random number be 1; or, in the case that the last bit of the true random number is 0, then re-generate a true random number until the last bit of the generated true random number is 1. This may reduce the computational workload of verifying the irreducible polynomial at a later stage, eventually yielding $a_0 = 1$, and the generated polynomial to be $p_1(x) = x^n + a_{n-1}x^{n-1} + \ldots + a_1 x + 1$.

Then, whether the polynomial is an irreducible polynomial is verified. If a verification result is "no", another set of true random number is generated from the random number generator of the signing party. With this newly generated true random number, return to re-generate a polynomial and to verify whether the polynomial is an irreducible polynomial. If the verification result is "yes", the verification is stopped and the irreducible polynomial is obtained.

There are multiple ways to verify the irreducible polynomial. Two preferable ways are presented in the present disclosure.

Way 1: verify in turn whether $\gcd(p_1(x), x^{2^i} - x) = 1$ is true, wherein $i = 1, 2, \ldots, [n/2]$, and $[n/2]$ means rounding of $n/2$. If verifications for all values of i are successful, it means that $p(x)$ is an irreducible polynomial of order n on GF(2) domain. Here, $\gcd(f(x), g(x))$ represents the greatest common factor of $f(x)$ and $g(x)$ on GF(2) domain, where $f(x)$ and $g(x)$ are two arbitrary polynomials.

Way 2: verify whether condition (1) $x^{2^n} = x \mod p_1(x)$ and condition (2) $\gcd(p_1(x), x^{2^{n/d}} - x) = 1$ are both true at the same time, where $x^{2^n} = x \mod p_1(x)$ indicates a remainder of $x^{2^n}$ mod $p_1(x)$ and a remainder of x mod $p_1(x)$ are identical, d is an arbitrary prime factor of n, gcd(f(x),g(x)) represents the greatest common factor of f(x) and g(x) on GF(2) domain, where f(x) and g(x) are two arbitrary polynomials. When the two verification conditions are both satisfied at the same time, $p_1(x)$ is an irreducible polynomial of order n on GF(2) domain.

Generally, take $n=2^k$, therefore only d=2 needs to be taken in condition (2). Optionally, take $n=2^7=128$. Because this way only needs to verify the two conditions, Fast Modular Composition (FMC) algorithm is adopted to obtain $x^{2^n}$ mod $p_1(x)$ and $x^{2^{n/2}}$ mod $p_1(x)$ quickly, and to replace $x^{2^{n/d}}$ in condition (2) with $x^{2^{n/2}}$ mod $p_1(x)$ for computation. This obtains a computation result faster by lowering the orders.

After the irreducible polynomial being generated, the signing party uses its first string of n-bit secret key $X_1$, serving as an input random number, together with the irreducible polynomial to generate a hash function based on a linear feedback shift register. A message to be signed is then input by the signing party into the hash function to obtain a hash value. A message digest is formed by the hash value and a character string comprised of coefficients of terms of respective orders except the highest order of the irreducible polynomial. The message digest may be formed by a preset rule, such as hash value+character string, character string+hash value, and the like. The length of message digest eventually obtained is 2n-bit. The signing party performs unconditionally secure encryption on the message digest using its second string of 2n-bit secret key $Y_1$. The unconditionally secure encryption is preferably a one-time pad XOR encryption, and a signature is generated after the encryption is performed.

The hash function based on the linear feedback shift register is a Toeplitz matrix with n×m dimensions, where n is a length of the first string of secret key of the signing party, and m is a length of the message to be signed.

A hash function based on a linear feedback shift register is generated by the signing party using the irreducible polynomial together with its first n-bit secret key $X_1$ serving as an input random number. In the embodiment, the hash function is a Toeplitz matrix of n×m dimensions based on a linear feedback shift register, where m is a length of the message to be signed. Matrix multiplication is performed on the hash function generated and a column vector corresponding to the message, such that a hash value corresponding to the message is obtained. The hash value is a column vector of length n, and a message digest is formed by the hash value and a character string comprised of coefficients of terms of respective orders except the highest order of the irreducible polynomial. The signing party performs an XOR encryption operation on the message digest using its second string of 2n-bit secret key $Y_1$ to obtain a final digital signature of length 2n.

By way of example, the signing party chooses a secret key and a true random number to generate a Toeplitz matrix based on a linear feedback shift register (hereinafter LFSR) to be a hash function. The Toeplitz matrix based on LFSR is an n×m matrix, where m is a length of a vector corresponding to the message to be signed, and it is a variable value; n is a fixed value, representing a length of a hash value vector generated after the matrix operates on the message. In other words, the Toeplitz matrix based on LFSR is able to convert the vector with any length m corresponding to the message to be signed, into a vector of a fixed length n, namely a hash value. Such an operation has no requirements on the length of the message received, which means that messages with any lengths may be signed during each round of signing, leading to higher signing efficiency than that of existing quantum digital signing technology.

(3) Verifying the Signature.

The signing party sends the message to be signed and the signature as a whole to the receiving party. The receiving party, upon reception, sends its two strings of secret keys $X_2$ and $Y_2$, the message to be signed and the signature to the verifying party. The verifying party, upon reception, sends its two strings of secret keys $X_3$ and $Y_3$ to the receiving party. The receiving party and the verifying party respectively deduce, according to secret keys held by themselves, the two strings of secret keys of the signing party. It should be noted that a channel for exchanging information between the receiving party and the verifying party is a classical channel that needs to be authenticated in order to prevent being tampered with.

In this case, the receiving party and the verifying party both possess $X_2$, $Y_2$, $X_3$, $Y_3$, then XOR operations are performed on the secret keys, i.e., $X_2 \oplus X_3$, $Y_2 \oplus Y_3$, to obtain final strings of secret keys identical to that of the signing party. The secret keys deduced by the receiving party are denoted as $X_1^B$ and $Y_1^B$, and the secret keys deduced by the verifying party are denoted as $X_1^C$ and $Y_1^C$.

The receiving party and the verifying party respectively use the second strings of secret keys of the signing party deduced by themselves, i.e., $Y_1^B$ or $Y_1^C$, to perform decryption operation on the signature, such that a first backward digest and a second backward digest may be obtained. Each of the first backward digest and the second backward digest is formed by a hash value and a character string comprised of coefficients of terms of respective orders except the highest order of the irreducible polynomial. According to a preset rule, an irreducible polynomial is generated by successively corresponding respective bits in the character string of each of the first backward digest and the second backward digest to coefficients of terms of respective orders other than the highest order of the polynomial, where a coefficient of the highest order is 1. Hash functions are generated by using the above generated irreducible polynomials and the first strings of secret keys of the signing party respectively deduced by the receiving party and the verifying party, i.e., $X_1^B$ and $X_1^C$, and the received message to be signed is input into the generated hash functions to generate a first forward hash value of the receiving party and a second forward hash value of the verifying party. In a case that the first forward hash value is equal to the hash value in the first backward digest, the receiving party accepts the signature, otherwise the receiving party does not accept it. In a case that the second forward hash value is equal to the hash value in the second backward digest, the verifying party accepts the signature, otherwise the verifying party does not accept it. Digital signing is completed when both the receiving party and the verifying party accept the signature at the same time.

In the technical solution of the present disclosure, it is required that the signing process is successful only when both the receiving party and the verifying party accept the signature at the same time. It needs to be emphasized that lengths of the secret keys consumed by the digital signing solution of the present disclosure are fixed, meaning that lengths of the two strings of secret keys of the receiving party and lengths of the two strings of secret keys of the verifying party may be fixed. Therefore, when signing a long message, the number of consumed true random number resources may be fixed in advance and does not alter with the length of the message. An appropriate length of a secret key is fixed in advance, so unconditionally secure digital signing may be performed. In this case, an effectively and unconditionally secure signing may be performed regardless of the length of a message to be encrypted in reality.

The technical solution of the present disclosure no longer fixes the irreducible polynomial, yet it generates the irreducible polynomial by a true random number and a method for determining whether a polynomial is irreducible, thereby directly avoiding a security risk of leaking the fixed irreducible polynomial.

Moreover, the security of the hash function used during an execution of a signing process is ensured by the irreducible polynomial and the secret key of the hash function used as an input random number. In addition, the irreducible polynomial depends on the true random number local to the signing party, which is not known by the receiving party nor by the verifying party before the signing process. In other words, an unconditionally secure hash function is used to ensure the security of the entire signing process. Security failure probability of quantum digital signature in the present disclosure is $m/(2^{n-1})$. Even if the efficiency is $m=2^{64}$, for $n=128$, the failure probability is only a negligible number of $10^{-19}$.

Second Embodiment

The present disclosure includes a quantum digital signcryption method, where participating parties are a signcrypting party Alice, a receiving party Bob and a verifying party Charlie, and the method further includes the following steps a, b and c.

Step a. Encryption: the signcrypting party Alice encrypts a plaintext message using a confidential secret key $k_a$ and obtains a cyphertext; the encryption is preferably implemented by an XOR operation.

Step b. Digital signing is performed on the cyphertext using the quantum digital signing method mentioned above. During the digital signing process on the cyphertext, the cyphertext is taken as a message to be signed, and the signcrypting party sends the confidential secret key $k_a$ to the receiving party in an unconditionally secure manner. The unconditionally secure manner is achieved via quantum secret key distribution technology or true quantum random number secure delivering, where a specific procedure is as follows.

1) Preparing Secret Keys.

A signcrypting party Alice, a receiving party Bob and a verifying party Charlie respectively hold two strings of random secret keys. The six strings of secret keys are grouped into two groups, denoted as group X and group Y. The two strings of random secret keys held by the signcrypting party Alice are denoted as $X_1$ and $Y_1$. In a similar manner, the receiving party Bob holds $X_2$ and $Y_2$ and the verifying party Charlie holds $X_3$ and $Y_3$. Secret sharing is formed among the secret keys of the signcrypting party Alice, the receiving party Bob and the verifying party Charlie. The secret sharing is preferably implemented by quantum secret sharing.

Secret sharing relationship: $X_1$ may be deduced only when $X_2$ and $X_3$ are held simultaneously, and $Y_1$ may be deduced only when $Y_2$ and $Y_3$ are held simultaneously, namely satisfying the following conditions:

$$X_1 \oplus X_2 \oplus X_3 = 0, Y_1 \oplus Y_2 \oplus Y_3 = 0,$$

in the formulas, $X_1$ and $Y_1$ are respectively a first string of secret key and a second string of secret key held by the signcrypting party Alice, $X_2$ and $Y_2$ are respectively a first string of secret key and a second string of secret key held by the receiving party Bob, $X_3$ and $Y_3$ are respectively a first string of secret key and a second string of secret key held by the verifying party Charlie, where $X_1$, $X_2$, $X_3$ are n-bit and $Y_1$, $Y_2$, $Y_3$ are 2n-bit.

2) Generating a Signature.

The signcrypting party Alice, via its own random number generator, obtains an n-bit true random number used to generate an irreducible polynomial. A specific procedure is as follows.

Firstly, a polynomial of order n in the GF(2) domain is generated by successively corresponding respective bits in the n-bit true random number to coefficients of terms of respective orders other than a highest order of the polynomial, where the coefficient of the highest order is 1. For example, a true random number of n-bit is $(a_{n-1}, a_{n-2}, \ldots, a_1, a_0)$, and a polynomial $p_1(x)=x^n+a_{n-1}x^{n-1}+\ldots+a_1x+a_0$ is generated. Preferably, only when $a_0=1$ may a generated polynomial be an irreducible polynomial. Therefore, to reduce the computational workload of verifying the irreducible polynomial at a later stage, determination of the true random number may be first conducted: in the case that the last bit of the true random number is 0, then let the last bit of the true random number be 1; or, in the case that the last bit of the true random number is 0, then re-generate a true random number until the last bit of the generated true random number is 1. This may reduce the computational workload of verifying the irreducible polynomial at a later stage, eventually yielding $a_0=1$, and the generated polynomial is $p_1(x)=x^n+a_{n-1}x^{n-1}+\ldots+a_1x+1$.

Then, whether the polynomial is an irreducible polynomial is verified. If a verification result is "no", another set of true random number is generated from the random number generator of the signcrypting party Alice. With this newly generated true random number, return to re-generate a polynomial and verify whether the polynomial is an irreducible polynomial. If the verification result is "yes", the verification is stopped and the irreducible polynomial is obtained.

There are multiple ways to verify the irreducible polynomial. Preferably two ways are presented in the present disclosure.

Way 1: verify in turn whether $\gcd(p_1(x),x^{2^i}-x)=1$ is true, wherein $i=1, 2, \ldots, [n/2]$, and $[n/2]$ means rounding of $n/2$. If verifications for all values of i are successful, it means that $p_1(x)$ is an irreducible polynomial of order n on GF(2) domain. Here, $\gcd(f(x),g(x))$ represents the greatest common factor of $f(x)$ and $g(x)$ on GF(2) domain, where $f(x)$ and $g(x)$ are two arbitrary polynomials.

Way 2: verify whether condition (1) $x^{2^n}=x$ mod $p_1(x)$ and condition (2) $\gcd(p_1(x),x^{2^{n/d}}-x)=1$ are both true at the same time, where $x^{2^n}=x$ mod $p_1(x)$ indicates a remainder of $x^{2^n}$ mod $p_1(x)$ and a remainder of x mod $p_1(x)$ are identical, d is an arbitrary prime factor of n, and $\gcd(f(x),g(x))$ represents the greatest common factor of $f(x)$ and $g(x)$ on GF(2) domain, where $f(x)$ and $g(x)$ are two arbitrary polynomials. When the two verification conditions are both satisfied at the same time, $p_1(x)$ is an irreducible polynomial of order n on GF(2) domain.

Generally, take $n=2^k$, therefore only $d=2$ needs to be taken in condition (2). Optionally, take $n=2^7=128$. Because this way only needs to verify the two conditions, Fast Modular Composition algorithm is adopted to obtain $x^{2^n}$ mod $p_1(x)$ and $x^{2^{n/2}}$ mod $p_1(x)$ quickly, and to replace $x^{2^{n/d}}$ in condition (2) with $x^{2^{n/2}}$ mod $p_1(x)$ for computation. This obtains a computation result faster by lowering the orders.

After the irreducible polynomial being generated, the signcrypting party Alice uses its first string of n-bit secret key $X_1$, serving as an input random number, together with the irreducible polynomial to generate a hash function based on a linear feedback shift register. A cyphertext is then input by the signcrypting party into the hash function to obtain a hash value. A cyphertext digest is formed by the hash value and a character string comprised of coefficients of terms of respective orders except the highest order of the irreducible polynomial. The cyphertext digest may be formed by a preset rule, such as hash value+character string, character string+hash value, and the like. The length of cyphertext digest eventually obtained is 2n-bit. The signcrypting party Alice performs unconditionally secure encryption on the cyphertext digest using its second string of 2n-bit secret key $Y_1$. The unconditionally secure encryption is preferably a one-time pad XOR encryption, and a signature is generated after the encryption is performed.

The hash function based on the linear feedback shift register is a Toeplitz matrix with n×m dimensions, where n is a length of the first string of secret key of the signcrypting party Alice, and m is a length of the cyphertext.

A hash function based on a linear feedback shift register is generated by the signcrypting party Alice using the irreducible polynomial together with its first group of n-bit secret key $X_1$ serving as an input random number. In the embodiment, the hash function is a Toeplitz matrix of n×m dimensions based on a linear feedback shift register, wherein m is a length of the cyphertext. Matrix multiplication is performed on the hash function generated and a column vector corresponding to the cyphertext, such that a hash value corresponding to the cyphertext is obtained. The hash value is a column vector of length n, and a cyphertext digest is formed by the hash value and a character string comprised of coefficients of terms of respective orders except the highest order of the irreducible polynomial. The signcrypting party Alice performs an XOR encryption operation on the cyphertext digest using its second string of 2n-bit secret key $Y_1$ to obtain a final digital signature of length 2n.

3) Verifying Signatures.

The signcrypting party Alice sends the cyphertext and the signature as a whole to the receiving party Bob. At the same time, the syncrypting party Alice also sends the confidential secret key $k_a$ to the receiving party Bob in an unconditionally secure manner.

The unconditionally secure manner is achieved via quantum secret key distribution technology or true quantum random number secure delivering. The receiving party Bob, upon reception, sends its two strings of secret keys $X_2$ and $Y_2$, the cyphertext and the signature to the verifying party Charlie. The verifying party Charlie, upon reception, sends its two strings of secret keys $X_3$ and $Y_3$ to the receiving party Bob. The receiving party Bob and the verifying party Charlie respectively deduce, according to the secret keys held by themselves, the two strings of secret keys of the signcrypting party Alice. It should be noted that a channel for exchanging information between the receiving party Bob and the verifying party Charlie is a classical channel that needs to be authenticated in order to prevent being tampered with.

In this case, the receiving party Bob and the verifying party Charlie both possess $X_2$, $Y_2$, $X_3$, $Y_3$, then XOR operations are performed on the secret keys, i.e., $X_2 \oplus X_3$, $Y_2 \oplus Y_3$, to obtain final strings of secret keys identical to that of the signcrypting party Alice. The secret keys deduced by the receiving party Bob are denoted as $X_1^B$ and $Y_1^B$, and the secret keys deduced by the verifying party Charlie are denoted as $X_1^C$ and $Y_1^C$.

The receiving party Bob and the verifying party Charlie respectively use the second strings of secret keys of the signcrypting party Alice deduced by themselves, i.e., $Y_1^B$ or $Y_1^C$, to perform decryption operation on the signature, such that a first backward digest $Digest^{b'}$ and a second backward digest $Digest^{c'}$ may be obtained. Each of the first backward digest $Digest^{b'}$ and the second backward digest $Digest^{c'}$ is formed by a hash value and a character string comprised of coefficients of terms of respective orders except the highest order of the irreducible polynomial. According to a previous preset rule, an irreducible polynomial is generated by successively corresponding respective bits in the character string of each of the first backward digest $Digest^{b'}$ and the second backward digest $Digest^{c'}$ to coefficients of terms of respective orders other than the highest order of the polynomial, where a coefficient of the highest order is 1. Hash functions are generated by using the above generated irreducible polynomials and the first strings of secret keys of the signcrypting party Alice respectively deduced by the receiving party Bob and verifying party Charlie, i.e., $X_1^B$ and $X_1^C$, and the received cyphertext is input into the generated hash functions to generate a first forward hash value $Digest^b$ of the receiving party Bob and a second forward hash value $Digest^c$ of the verifying party Charlie. In a case that the first forward hash value $Digest^b$ is equal to the hash value in the first backward digest $Digest^{b'}$, the receiving party Bob accepts the signature, otherwise the receiving party Bob does not accept it. In a case that the second forward hash value $Digest^c$ is equal to the hash value in the second backward digest $Digest^{c'}$, the verifying party Charlie accepts the signature, otherwise the verifying party Charlie does not accept it. Digital signing is completed when both the receiving party Bob and the verifying party Charlie accept the signature at the same time.

Step c. The signing is considered successful only when both the receiving party Bob and the verifying party Charlie accept the signature, otherwise the signing fails. Upon completing the digital signing, the receiving party Bob decrypts the cyphertext to obtain a plaintext message based on the confidential secret key $k_a$, where the plaintext message is a message that needs to be obtained eventually.

The solution does not require the verifying party Charlie to be trustful, and this does not affect the security of signcryption. Because there is no need for the signcrypting party Alice to share the confidential secret key $k_a$ used to encrypt the plaintext with the verifying party Charlie, there is no way for the verifying party Charlie to obtain the plaintext message, thereby not affecting the security of encryption in the solution. Meanwhile, security of the signature in the signcryption solution is ensured by an unconditionally secure hash function and a one-time pad, which does not require the verifying party Charlie to be trustful. The signcryption solution that does not need a trustworthy verifying party Charlie has higher practicability, requires less from the participating parties, and is easier to be promoted.

Third Embodiment

The present disclosure includes a quantum digital signcryption method, where participating parties are a signcrypting party Alice, a receiving party Bob and a verifying party Charlie, and the method further includes the following steps.

S1, encryption: the signcrypting party Alice encrypts a plaintext message using a confidential secret key $k_a$ to obtain a cyphertext; the signcrypting party Alice sends the cyphertext to the receiving party Bob, and upon reception, the receiving party Bob sends the cyphertext to the verifying party Charlie; meanwhile, the signcrypting party Alice also sends the confidential secret key $k_a$ to the receiving party Bob and the verifying party Charlie in an unconditionally secure manner. The unconditionally secure manner is achieved via quantum secret key distribution technology or true quantum random number secure delivering.

S2, digital signing is performed on a plaintext message using the same quantum digital signing method as in the first embodiment, where the plaintext message is regarded as a message to be signed during the process of digital signing on the plaintext message, with the following differences: when verifying the signature, the receiving party Bob and the verifying party Charlie decrypt, based on the confidential secret key $k_a$, the cyphertext to obtain the message to be signed, namely the plaintext message. The signcrypting party Alice no longer needs to send the message to be signed to the receiving party nor to the verifying party.

S3, upon completing the digital signing, the plaintext message is the message that eventually needs to be obtained.

In this solution, it is required that the verifying party Charlie is trustful, which has the advantage that the trustful verifying party Charlie is able to automatically back up a copy of the plaintext message.

What is claimed is:

1. A quantum digital signing method, comprising:
   (1) a step of preparing secret keys, wherein a signing party, a receiving party and a verifying party respectively holding two strings of random secret keys, and secret sharing being formed among the secret keys of the signing party, the receiving party and the verifying party;
   (2) a step of generating a signature:
      obtaining, by a random number generator of the signing party, an n-bit true random number, wherein the n-bit true random number is used to generate an irreducible polynomial;
      generating, by the signing party, a hash function based on a linear feedback shift register by using a first string of secret key of the signing party, serving as an input random number, together with the irreducible polynomial; obtaining, by the signing party, a hash value by inputting a message to be signed into the hash function; then a message digest is formed by the hash value and a character string comprised of coefficients of terms of respective orders except the highest order of the irreducible polynomial;
      generating, by the signing party, a signature by performing an unconditionally secure encryption on the message digest using a second string of secret key of the signing party;
   (3) a step of verifying the signature:
      sending, by the signing party, the message to be signed and the signature as a whole to the receiving party; the receiving party, upon reception, sending its two strings of secret keys, the message to be signed and the signature to the verifying party; the verifying party, upon reception, sending its two strings of secret keys to the receiving party; deducing, by the receiving party and the verifying party respectively, the two strings of secret keys of the signing party according to secret keys held by the receiving party and the verifying party;
      performing decryption operation on the signature by the receiving party and the verifying party respectively using second strings of secret key of the signing party deduced by the receiving party and the verifying party to obtain a first backward digest and a second backward digest; generating an irreducible polynomial by successively corresponding respective bits in a character string of each of the first backward digest and the second backward digest to coefficients of terms of respective orders other than the highest order of the irreducible polynomial, where a coefficient of the highest order is 1; generating hash functions using the generated irreducible polynomial and first strings of secret keys of the signing party respectively deduced by the receiving party and the verifying party, and inputting the received message to be signed into the generated hash functions to generate a first forward hash value of the receiving party and a second forward hash value of the verifying party; wherein in a case that the first forward hash value is equal to a hash value in the first backward digest, the receiving party accepts the signature, otherwise the receiving party does not accept the signature, in a case that the second forward hash value is equal to a hash value in the second backward digest, the verifying party accepts the signature, otherwise the verifying party does not accept the signature, and digital signing is completed when both the receiving party and the verifying party accept the signature at the same time.

2. The quantum digital signing method according to claim 1, wherein in the step (1), the secret keys of participating parties satisfy following secret sharing conditions:

$$X_1 \oplus X_2 \oplus X_3 = 0, Y_1 \oplus Y_2 \oplus Y_3 = 0,$$

in the formulas, $X_1$ and $Y_1$ are respectively a first string of secret key and a second string of secret key held by the signing party, $X_2$ and $Y_2$ are respectively a first string of secret key and a second string of secret key held by the receiving party, $X_3$ and $Y_3$ are respectively a first string of secret key and a second string of secret key held by the verifying party.

3. The quantum digital signing method according to claim 1, wherein in the step (2), the unconditionally secure encryption is a one-time pad XOR encryption.

4. The quantum digital signing method according to claim 1, wherein in the step (2), the hash function based on the linear feedback shift register is a Toeplitz matrix with n×m dimensions, wherein n is a length of the first string of secret key of the signing party, m is a length of the message to be signed.

5. The quantum digital signing method according to claim 1, wherein in the step (2), a specific procedure for generating the irreducible polynomial using the n-bit true random number comprises:
   1) firstly, generating a polynomial of order n in a GF(2) domain by successively corresponding respective bits in the n-bit true random number to coefficients of terms of respective orders other than the highest order of the polynomial, wherein a coefficient of the highest order is 1;
   2) secondly, verifying whether the polynomial is an irreducible polynomial; in the case that a verification result is no, generating another set of true random number from the random number generator of the signing party, and with the newly generated true random number, returning to re-generate a polynomial and to verify whether the polynomial is an irreducible polynomial; in the case that the verification result is yes, stopping the verification and obtaining the irreducible polynomial.

6. The quantum digital signing method according to claim 5, wherein a way to verify whether the polynomial is an irreducible polynomial comprises:

verifying in turn whether $\gcd(p_1(x), x^{2^i}-x)=1$ is true, wherein $i=1, 2, \ldots, [n/2]$, and $[n/2]$ means rounding of $n/2$; in a case that verifications of all values of $i$ are successful, determining that $p_1(x)$ is an irreducible polynomial of order $n$ on GF(2) domain; here, $\gcd(f(x), g(x))$ represents the greatest common factor of $f(x)$ and $g(x)$ on GF(2) domain, and $f(x)$ and $g(x)$ are two arbitrary polynomials.

7. The quantum digital signing method according to claim 5, wherein a way to verify whether the polynomial is an irreducible polynomial comprises:

verifying whether condition $x^{2^n}=x \bmod p_1(x)$ and condition $\gcd(p_1(x), x^{2^{n/d}}-x)=1$ are both true at the same time, where $x^{2^n}=x \bmod p_1(x)$ indicates a remainder of $x^{2^n} \bmod p_1(x)$ and a remainder of $x \bmod p_1(x)$ are identical, $d$ is an arbitrary prime factor of $n$, $\gcd(f(x), g(x))$ represents the greatest common factor of $f(x)$ and $g(x)$ on GF(2) domain, where $f(x)$ and $g(x)$ are two arbitrary polynomials; in a case that the two verification conditions are both satisfied at the same time, determining that $p_1(x)$ is an irreducible polynomial of order $n$ on GF(2) domain.

8. The quantum digital signing method according to claim 5, wherein prior to the step (1), in a case that the last bit of the n-bit true random number is 0, the last bit of the n-bit true random number is set to be 1; or, in a case that the last bit of the true random number is 0, an n-bit true random number is re-generated until the last bit of the generated n-bit true random number is 1.

9. A quantum digital signcryption method based on a quantum digital signing method, the quantum digital signcryption comprising:

step a. encrypting: encrypting, by a signcrypting party, a plaintext using a confidential secret key to obtain a cyphertext;

step b. performing a digital signing on the cyphertext through following sub-steps(1) to (3):

sub-step (1) preparing secret keys, wherein a signing party, a receiving party and a verifying party respectively holding two strings of random secret keys, and secret sharing being formed among the secret keys of the signing party, the receiving party and the verifying party;

sub-step (2) generating a signature:

obtaining, by a random number generator of the signing party, an n-bit true random number, wherein the n-bit true random number is used to generate an irreducible polynomial;

generating, by the signing party, a hash function based on a linear feedback shift register by using a first string of secret key of the signing party, serving as an input random number, together with the irreducible polynomial; obtaining, by the signing party, a hash value by inputting a message to be signed into the hash function; then a message digest is formed by the hash value and a character string comprised of coefficients of terms of respective orders except the highest order of the irreducible polynomial;

generating, by the signing party, a signature by performing an unconditionally secure encryption on the message digest using a second string of secret key of the signing party:

sub-step (3) verifying the signature:

sending, by the signing party, the message to be signed and the signature as a whole to the receiving party; the receiving party, upon reception, sending its two strings of secret keys, the message to be signed and the signature to the verifying party; the verifying party, upon reception, sending its two strings of secret keys to the receiving party; deducing, by the receiving party and the verifying party respectively, the two strings of secret keys of the signing party according to secret keys held by the receiving party and the verifying party;

performing decryption operation on the signature by the receiving party and the verifying party respectively using second strings of secret keys of the signing party deduced by the receiving party and the verifying party to obtain a first backward digest and a second backward digest; generating an irreducible polynomial by successively corresponding respective bits in a character string of each of the first backward digest and the second backward digest to coefficients of terms of respective orders other than the highest order of the irreducible polynomial, where a coefficient of the highest order is 1; generating hash functions using the generated irreducible polynomial and first strings of secret keys of the signing party respectively deduced by the receiving party and the verifying party, and inputting the received message to be signed into the generated hash functions to generate a first forward hash value of the receiving party and a second forward hash value of the verifying party; wherein in a case that the first forward hash value is equal to a hash value in the first backward digest, the receiving party accepts the signature, otherwise the receiving party does not accept the signature, in a case that the second forward hash value is equal to a hash value in the second backward digest, the verifying party accepts the signature, otherwise the verifying party does not accept the signature, and digital signing is completed when both the receiving party and the verifying party accept the signature at the same time;

wherein during the digital signing process on the cyphertext, the cyphertext is taken as a message to be signed and the confidential secret key is sent by the signcrypting party to the receiving party in an unconditionally secure manner; and step c. upon completing the digital signing, deciphering the cyphertext by the receiving party based on the confidential secret key to obtain a plaintext, wherein the plaintext is a message needs to be obtained eventually.

10. The quantum digital signcryption method according to claim 9, wherein in the sub-step (1), the secret keys of participating parties satisfy following secret sharing conditions:

$$X_1 \oplus X_2 \oplus X_3 = 0, Y_1 \oplus Y_2 \oplus Y_3 = 0,$$

in the formulas, $X_1$ and $Y_1$ are respectively a first string of secret key and a second string of secret key held by the signing party, $X_2$ and $Y_2$ are respectively a first string of secret key and a second string of secret key held by the receiving party, $X_3$ and $Y_3$ are respectively a first string of secret key and a second string of secret key held by the verifying party.

11. The quantum digital signcryption method according to claim 9, wherein in the sub-step (2), the unconditionally secure encryption is a one-time pad XOR encryption.

12. The quantum digital signcryption method according to claim 9, wherein in the sub-step (2), the hash function based on the linear feedback shift register is a Toeplitz matrix with n×m dimensions, wherein n is a length of the first string of secret key of the signing party, m is a length of the message to be signed.

13. The quantum digital signcryption method according to claim 9, wherein in the sub-step (2), a specific procedure for generating the irreducible polynomial using the n-bit true random number comprises:
  1) firstly, generating a polynomial of order n in a GF(2) domain by successively corresponding respective bits in the n-bit true random number to coefficients of terms of respective orders other than the highest order of the polynomial, wherein a coefficient of the highest order is 1;
  2) secondly, verifying whether the polynomial is an irreducible polynomial; in the case that a verification result is no, generating another set of true random number from the random number generator of the signing party, and with the newly generated true random number, returning to re-generate a polynomial and to verify whether the polynomial is an irreducible polynomial; in the case that the verification result is yes, stopping the verification and obtaining the irreducible polynomial.

14. The quantum digital signcryption method according to claim 9, wherein in the step b, the unconditionally secure manner is achieved via a quantum secret key distribution technology or true quantum random number secure delivering.

15. A quantum digital signcryption method based on a quantum digital signing method, the quantum digital signcryption method comprising:
  S1, encryption: encrypting, by a signcrypting party, a plaintext using a confidential secret key to obtain a cyphertext: sending the cyphertext to a receiving party from the signcrypting party, and upon reception, sending the cyphertext to a verifying party from the receiving party; meanwhile, sending the confidential secret key to the receiving party and the verifying party in an unconditionally secure manner from the signcrypting party;
  S2, performing digital signing on the plaintext message through following sub-steps (1) to (3):
  sub-step (1) preparing secret keys, wherein a signing party, a receiving party and a verifying party respectively holding two strings of random secret keys, and secret sharing being formed among the secret keys of the signing party, the receiving party and the verifying party;
  sub-step (2) generating a signature:
    obtaining, by a random number generator of the signing party, an n-bit true random number, wherein the n-bit true random number is used to generate an irreducible polynomial;
    generating, by the signing party, a hash function based on a linear feedback shift register by using a first string of secret key of the signing party, serving as an input random number, together with the irreducible polynomial; obtaining, by the signing party, a hash value by inputting a message to be signed into the hash function; then a message digest is formed by the hash value and a character string comprised of coefficients of terms of respective orders except the highest order of the irreducible polynomial;
    generating, by the signing party, a signature by performing an unconditionally secure encryption on the message digest using a second string of secret key of the signing party;
  sub-step (3) verifying the signature:
    sending, by the signing party, the message to be signed and the signature as a whole to the receiving party; the receiving party, upon reception, sending its two strings of secret keys, the message to be signed and the signature to the verifying party: the verifying party, upon reception, sending its two strings of secret keys to the receiving party: deducing, by the receiving party and the verifying party respectively, the two strings of secret keys of the signing party according to secret keys held by the receiving party and the verifying party;
    performing decryption operation on the signature by the receiving party and the verifying party respectively using second strings of secret key of the signing party deduced by the receiving party and the verifying party to obtain a first backward digest and a second backward digest; generating an irreducible polynomial by successively corresponding respective bits in a character string of each of the first backward digest and the second backward digest to coefficients of terms of respective orders other than the highest order of the irreducible polynomial, where a coefficient of the highest order is 1; generating hash functions using the generated irreducible polynomials and first strings of secret keys of the signing party respectively deduced by the receiving party and the verifying party, and inputting the received message to be signed into the generated hash functions to generate a first forward hash value of the receiving party and a second forward hash value of the verifying party; wherein in a case that the first forward hash value is equal to a hash value in the first backward digest, the receiving party accepts the signature, otherwise the receiving party does not accept the signature, in a case that the second forward hash value is equal to a hash value in the second backward digest, the verifying party accepts the signature, otherwise the verifying party does not accept the signature, and digital signing is completed when both the receiving party and the verifying party accept the signature at the same time:
  wherein the plaintext message is taken as a message to be signed during the process of digital signing on the plaintext message; decrypting, by the receiving party and the verifying party, the cyphertext based on the confidential secret key to obtain the message to be signed, namely the plaintext message, and the message to be signed does not need to be sent by the signcrypting party to the receiving party nor to the verifying party;

S3, upon completing the digital signing, obtaining the plaintext message which is the message eventually needed to be obtained.

16. The quantum digital signcryption method according to claim 15, wherein in the sub-step (1), the secret keys of participating parties satisfy following secret sharing conditions:

$$X_1 \oplus X_2 \oplus X_3 = 0, Y_1 \oplus Y_2 \oplus Y_3 = 0,$$

in the formulas, $X_1$ and $Y_1$ are respectively a first string of secret key and a second string of secret key held by the signing party, $X_2$ and $Y_2$ are respectively a first string of secret key and a second string of secret key held by the receiving party, $X_3$ and $Y_3$ are respectively a first string of secret key and a second string of secret key held by the verifying party.

17. The quantum digital signcryption method according to claim 15, wherein in the sub-step (2), the unconditionally secure encryption is a one-time pad XOR encryption.

18. The quantum digital signcryption method according to claim 15, wherein in the sub-step (2), the hash function based on the linear feedback shift register is a Toeplitz matrix with n×m dimensions, wherein n is a length of the first string of secret key of the signing party, m is a length of the message to be signed.

19. The quantum digital signcryption method according to claim 15, wherein in the sub-step (2), a specific procedure for generating the irreducible polynomial using the n-bit true random number comprises:

1) firstly, generating a polynomial of order n in a GF(2) domain by successively corresponding respective bits in the n-bit true random number to coefficients of terms of respective orders other than the highest order of the polynomial, wherein a coefficient of the highest order is 1;

2) secondly, verifying whether the polynomial is an irreducible polynomial; in the case that a verification result is no, generating another set of true random number from the random number generator of the signing party, and with the newly generated true random number, returning to re-generate a polynomial and to verify whether the polynomial is an irreducible polynomial; in the case that the verification result is yes, stopping the verification and obtaining the irreducible polynomial.

20. The quantum digital signcryption method according to claim 15, wherein in S2, the unconditionally secure manner is achieved via a quantum secret key distribution technology or true quantum random number secure delivering.

* * * * *